H. WEYGAND.
JOINT AND CONNECTION FOR CROSSED OR ABUTTING PARTS.
APPLICATION FILED APR. 6, 1909.

1,014,684.                                   Patented Jan. 16, 1912.
                                                  3 SHEETS—SHEET 1.

Witnesses:
W. R. Schulz
Edward Schorr.

Inventor
Heinrich Weygand
by his attorney
Hans v. Briesen

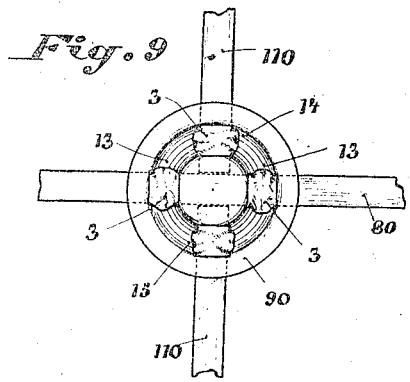
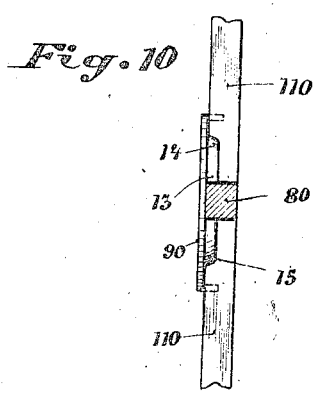
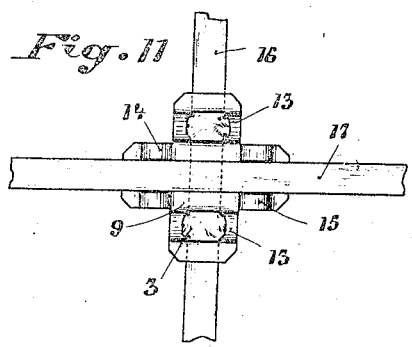
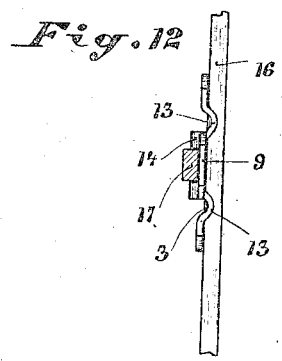
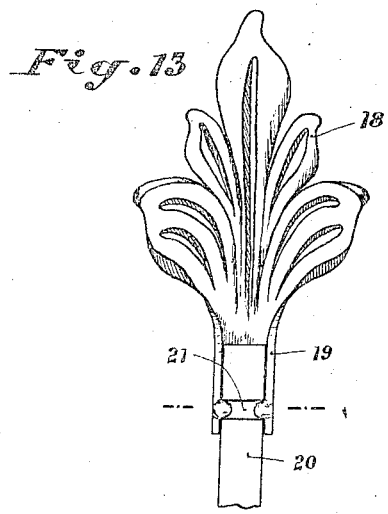
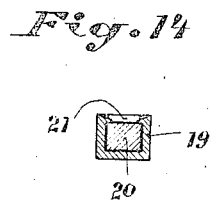

H. WEŸGAND.
JOINT AND CONNECTION FOR CROSSED OR ABUTTING PARTS.
APPLICATION FILED APR. 6, 1909.
1,014,684.
Patented Jan. 16, 1912.
3 SHEETS—SHEET 3.
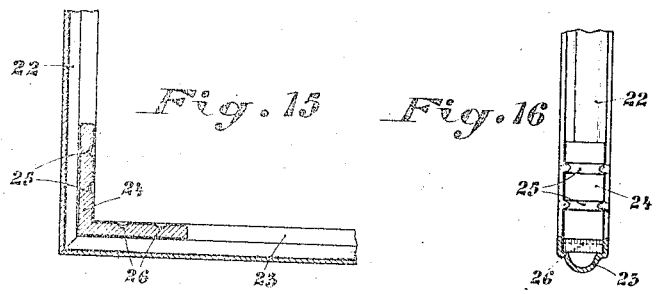
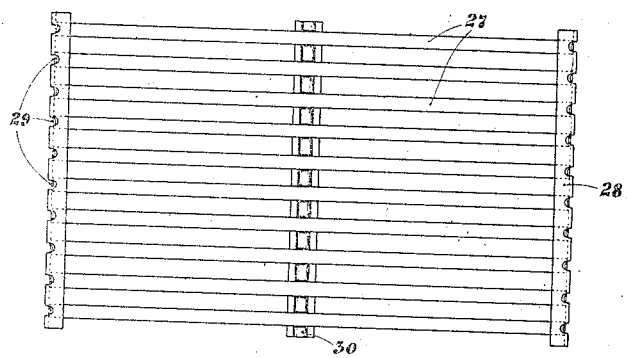
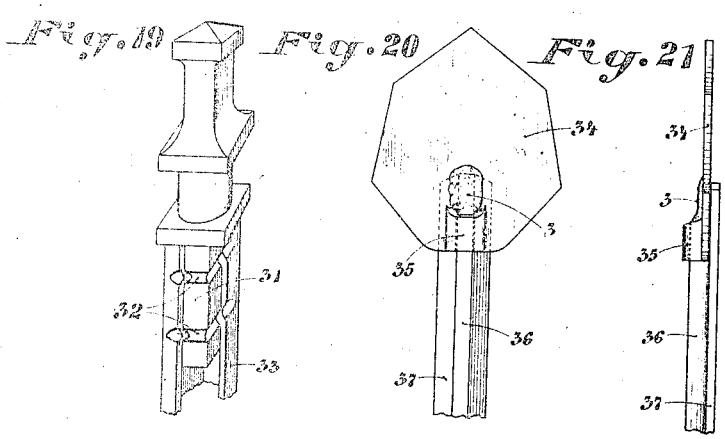

UNITED STATES PATENT OFFICE.

HEINRICH WEŸGAND, OF HATTINGEN-RUHR, GERMANY.

JOINT AND CONNECTION FOR CROSSED OR ABUTTING PARTS.

1,014,684.   Specification of Letters Patent.   Patented Jan. 16, 1912.

Application filed April 6, 1909. Serial No. 488,262.

*To all whom it may concern:*

Be it known that I, HEINRICH WEŸGAND, a citizen of the German Empire, and resident of 4 Bismarckstrasse, Hattingen-Ruhr, Germany, have invented certain new and useful Improvements in Joints and Connections for Crossed or Abutting Parts, of which the following is a specification.

This invention relates to the joining together of parts crossing or abutting against each other, without rivets, tenons, bosses or the like, and substantially consists in making one of the parts penetrate or traverse the other, and upsetting or melting down the edge of the former in a cavity in the latter.

Figure 1:
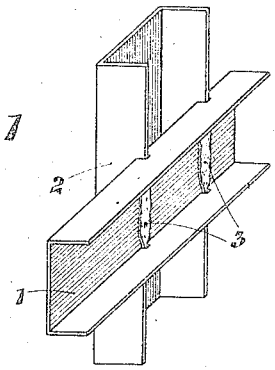
Figure 2:
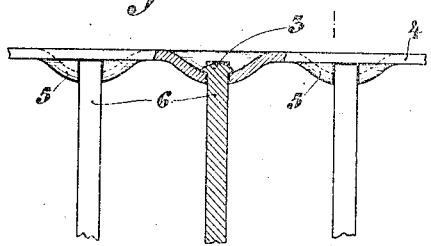
Figure 3:
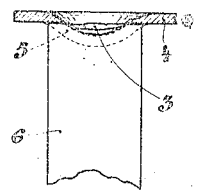
Figure 4:
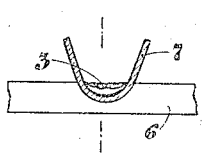
Figure 5:
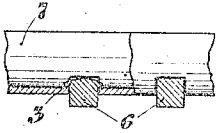
Figure 6:
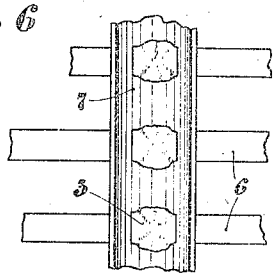
Figures 7, 8:
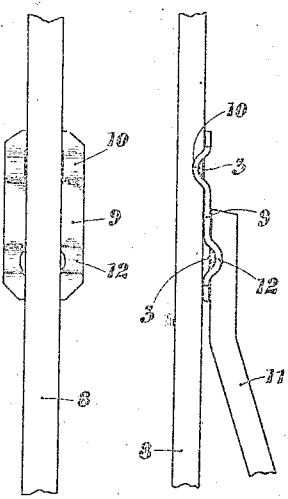

In the accompanying drawings: Figure 1 is a perspective view of my improved joint, showing it applied to a pair of intersecting U-beams; Fig. 2 a sectional side view of a modification; Fig. 3 an end view of Fig. 2; Fig. 4 a cross section of a further modification; Fig. 5 a longitudinal section of Fig. 4; Fig. 6 a ground plan thereof; Fig. 7 a front view of a further modification; Fig. 8 a side view thereof; Fig. 9 a plan of a further modification; Fig. 10 a cross section thereof; Fig. 11 a plan of a further modification; Fig. 12 a cross section thereof; Fig. 13 a plan of a further modification; Fig. 14 a cross section thereof; Fig. 15 a longitudinal section of a further modification; Fig. 16 a cross section thereof; Fig. 17 a ground plan of a further modification; Fig. 18 a side view thereof; Fig. 19 a perspective view of a further modification; Fig. 20 a rear view of a still further modification, and Fig. 21 a side view thereof.

Referring in the first place to Fig. 1, the channel-iron 1 has in its web two slots which also extend a short distance into its flanges and enable the flanges of the bar 2 to engage the bar 1. The flanges of the bar 2 are flattened or upset to form beads 3, which make a perfectly secure connection between the two bars.

In Figs. 2 and 3 the strip or plate 4 has hemispherical, hollow protuberances 5 with longitudinal slots of such width that the flat bars 6 fit exactly thereinto and of such length that the parts 6 abut against the flat undersurface of the part 4. Those portions of the parts 6 which protrude into the cavities of the protuberances 5 are upset to form heads or beads 3, which lock the parts together. For this method of connection it is essential that the width of the part 6 exceeds the length of the slots.

If a plurality of bars have to be fixed across a transverse bar, the latter is preferably made of U-section, or the like, so that the separate protuberances 5 may be dispensed with. In Figs. 4, 5 and 6 the transverse bars 6 are partly sunk into slots in the bar 7, the connection being made by upsetting the edges of the bars 6 in the channel of the bar 7. The originally considerable strength of the channel bars, due to their shape, is further increased by the upsetting or beading at the edges.

Figs. 7 and 8 illustrate the connection of two bars oblique to each other. A strut 11 abuts against one side of a plate 9, which has a channel 12 in which part of he edge of bar 11 is upset to form a bead 3. Plate 9 is then placed with its opposite side against a bar 8, and the semi-cylindrical, hollow protuberance 10 of the said plate is penetrated by the bar 8. The connection between the bar 8 and the plate 9 is made by upsetting the edge of the bar 8, to form a bead 3 within the cavity of the protuberance.

Figs. 9 and 10 show a transverse bar 80, with two vertical bars 110 abutting against it to form a cross, all the bars being in the same plane. The plate 90 at the junction of the bars is fastened to the bar 80 by beads 3 formed at 13, 13 in an annular cavity of the plate, traversed by the bar 80. The other two bars 110 are similarly fastened by means of beads 3 made at 14 and 15.

In Figs. 11 and 12 the two rods 16 and 17 cross each other with a small space between them and are joined together by means of a plate 9, to which the rear bar is locked by means of beads formed in cavities 13, the front bar being locked to the plate by means of beads formed in oppositely directed cavities 14 and 15. The plate 9 in this case serves solely for holding the two bars together, without having a supporting function as in Figs. 9 and 10.

Figs. 13 and 14 illustrate the connection of an ornamental head 18 to the end of a bar. The head 18 has a socket 19 which embraces the end of the bar 20, and the edges of which are upset to engage a transverse cavity 21 in the bar.

In Figs. 15 and 16 the bars 22 and 23 are channeled and abut against each other at a right angle. An angle-piece 24 placed in the channel, at the joint has transverse grooves 25 and 26 at the ends of which the edges of the bars 22 and 23 are upset, so that they engage the said grooves and lock the bars to the angle-piece. The fastening is totally invisible from outside.

Figs. 17 and 18 represent a boot-scraper. The ends of the scrapers 27 are encompassed by U-bars 28 having inwardly extending slitted bulges 29 spaced to conform to the spacing of scrapers 27. The ends of these scrapers are projected through these bulges and are then upset. Intermediate the end bars 28, scrapers 27 are supported upon a flanged channel bar 30 which is slitted in alinement with scrapers 27, so that the lower sides of the scrapers may be projected into the concavity of the bar and may then be upset.

In Fig. 19, the pintle of a door hinge has a squared end-piece 31 provided with a series of cavities or grooves 32 into which project a corresponding series of flanges or beads formed on a hollow post 33 which incloses said end-piece.

The ornamental head-plate 34 shown in Figs. 20 and 21 has a kind of pocket 35 for the flange 36 of the bar 37, the plate being slotted so that the flange can traverse the pocket and be beaten flat against the back of the plate. The plate is thus firmly secured to the bar, and can not be rotated.

In some cases the small dimensions of the parts to be joined together, or the shape of the article to be produced, for example a grating or boot-scraper, may render it difficult or inconvenient to support the parts in a manner which will allow of upsetting the edges as described, and for manufacturing on a large scale it may also be desirable to have a more rapid method of enlarging the edges. In such cases it is often convenient to melt down the protruding edge in the cavity, to form a kind of head, the melting being preferably effected by the means commonly used for the purpose of autogenous soldering, such as a flame-arc or oxyhydrogen burner, so that in addition to forming the "head", some metal runs into the slot and binds together the parts. Even as regards the soldering, or welding itself, the connection of the parts as hereinbefore described is of advantage to the appearance and security of the joint. A certain preliminary connection is afforded by the engagement of the slotted part with the other part. Of the metal available for welding, part runs into the joint, and part is burned. In the case of two flat surfaces which merely abut one upon the other, the melting process rounds off the edges, and thus not only reduces the area of contact but produces an unsightly joint. On the other hand, if one of the parts has penetrated the other, and is freely protruding into a cavity of the latter, there is an abundant supply of metal available for welding purposes, the joint is filled with metal, and in addition a head is formed which mechanically locks the parts together. Moreover, the sharp protruding edges are freely exposed to the flame, so that the protruding metal is quickly melted, without risk of melting and damaging the adjacent parts.

What I claim is:—

A connection of the class described, comprising a first hollowed member having a transverse slot that opens into the hollow of said member at the axial center thereof, and a second member rigidly engaging with its longitudinal edge the outer side of the first member and projecting with said edge in part through the slot into the hollow of said first member, said projecting part being upset within said hollow, to form a clenched connection between the members.

Signed by me at Barmen, Germany, this 19th day of March 1909.

HEINRICH WEYGAND. [L. S.]

Witnesses:
 OTTO KÖNIG,
 AUG. HELLER.